(No Model.)
M. L. TROWBRIDGE.
SUPPLEMENTARY TIRE FOR WAGON WHEELS.
No. 271,998. Patented Feb. 6, 1883.
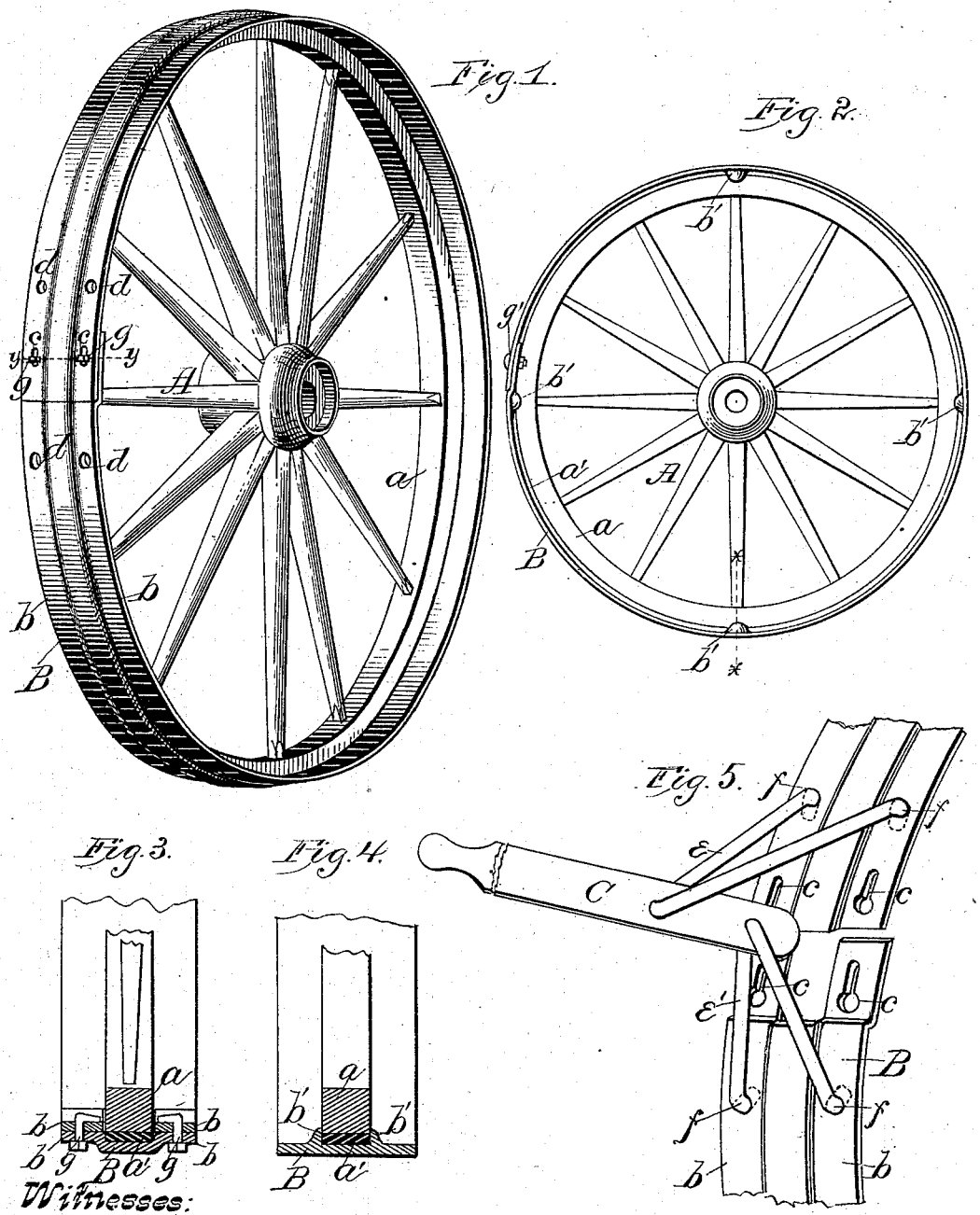

UNITED STATES PATENT OFFICE.

MARTIN L. TROWBRIDGE, OF GREENFIELD, WISCONSIN.

SUPPLEMENTARY TIRE FOR WAGON-WHEELS.

SPECIFICATION forming part of Letters Patent No. 271,998, dated February 6, 1883.

Application filed November 21, 1882. (No model.)

*To all whom it may concern:*

Be it known that I, MARTIN L. TROWBRIDGE, of Greenfield, in the county of Milwaukee, and in the State of Wisconsin, have invented certain new and useful Improvements in Supplementary Tires for Wagon-Wheels; and I do hereby declare that the following is a full, clear, and exact description thereof.

My invention relates to supplementary tires for vehicle-wheels; and it consists in the construction and method of attachment of said tires, as well as in the device used in securing such attachment, all as will be more fully set forth hereinafter.

In the drawings, Figure 1 is a perspective of a wagon-wheel supplied with one form of my extra tire. Fig. 2 is a side elevation of a wheel furnished with another form. Fig. 3 is a section on the line $y\,y$ of Fig. 7. Fig. 4 is a section on the line $x\,x$ of Fig. 2, and Fig. 5 is a view showing the construction and mode of operation of the lever employed in adjusting my supplementary tire to place.

Heretofore on swampy or very soft land great difficulty has been experienced by reason of the ordinary wagon-wheels sinking into the soil, so that only light loads of farm produce could be carried, and these slowly and with difficulty. It has been sought to overcome this by making the fellies enormously large and wide; but this has been objectionable, for these clumsy and heavy wheels, while serving the purpose on the swampy or soft earth, were found to be themselves a hinderance to progress when the road was reached. To obviate all this and secure all the advantages of the large fellies, without any of their drawbacks, I have devised my present invention.

A represents the wheel of an ordinary farm-wagon; $a$, its fellies, and $a'$ the ordinary tire.

B is my supplementary tire, and is either provided with a central grooved ridge, as shown in Figs. 1, 3, and 5, or perfectly flat, as in Figs. 2 and 4. The depression referred to is just the width necessary for receiving the felly and tire of the wheel, and as my supplementary tire is made of comparatively thin bar-iron the said depression causes a ridge on the opposite side, as shown, with flanges $b\,b$ on either side, and the wagon-wheel is securely held within the described groove. With the flat supplementary tire, however, it is necessary to provide equivalent means for holding the wagon-wheels, and hence I weld on at intervals the lugs $b'\,b'$, (shown in Figs. 2 and 4,) in pairs with just sufficient space between the lugs of each pair to accommodate the felly and tire of the wagon-wheel, and hence these lugs on the flat tire exactly correspond to the groove in the other tire. My tire is provided at each end with a pair of holes or slots, $c\,c$, arranged one on each side of the ridge or part where the wagon-wheel rests, for the purpose of securing the said ends together by bolt or key; and in order to bring the ends together over the wheel a pair of holes, $d\,d$, are cut in the flanges of my tire, just back of and in line with the holes or slots $c\,c$, which holes $d\,d$ are designed to accommodate the hooked ends of my double lever C, to be next described.

The lever C consists of a long shank, perforated near its end for the reception of the double claw or link $e$, and again perforated, nearer its handle, for the reception of a similar claw, $e'$. These claws have hooked ends $f\,f$, and when my tire has been bent around the wagon-wheel one of these hooks $f$ is inserted into each of the holes $d$, and then a pull is given upon the lever, which brings one end of my supplementary tire over the other until the tire is tight upon the wheel and the holes or slots $c\,c$ in each end coincide, when the two ends may be quickly fastened by either keys $g$, as shown in Figs. 1 and 3, or bolts and nuts, as shown at $g'$ in Fig. 2.

In order that my supplementary tire may present a uniformly smooth surface, without any ridge or unevenness where the ends are united, I bend one end down and out from just behind the holes or slots $c\,c$ and cut away the central part of this bent end, making my cut just the width of the wagon-felly, as clearly shown in Fig. 5, which shows the grooved form of the tire thus bent and cut away, and it will be understood that the flat tire is treated in precisely the same manner. The result of this is that the two ends, when united, make a smooth joint, as shown in Figs. 1 and 2, and hence do not present any obstruction at that point—a feature of value, as otherwise there would be a disagreeable bumping or rising with every revolution of the wheels when the swampy or soft land had been left and the wagon was on the hard road.

Having thus described my invention, what I claim as new, and desire to secure by Letters Patent, is—

A supplementary removable wide tire, provided with a groove or lugs for the reception of a wagon-wheel, and having holes or slots and keys or bolts for securing the ends of said tire together, as set forth.

In testimony that I claim the foregoing I have hereunto set my hand, on this 3d day of November, 1882, in the presence of two witnesses.

MARTIN L. TROWBRIDGE.

Witnesses:
   STANLEY S. STOUT,
   H. G. UNDERWOOD.